US011040878B2

(12) United States Patent
Bulan et al.

(10) Patent No.: US 11,040,878 B2
(45) Date of Patent: *Jun. 22, 2021

(54) METHOD FOR FLEXIBLY CONTROLLING THE USE OF HYDROCHLORIC ACID FROM CHEMICAL PRODUCTION

(71) Applicant: COVESTRO DEUTSCHLAND AG, Leverkusen (DE)

(72) Inventors: Andreas Bulan, Langenfeld (DE); Johann Rechner, Kempen (DE); Rainer Weber, Odenthal (DE); Juergen Hecke, Burscheid (DE); Wolfgang Kern, Moers (DE); Martin Leipnitz, Cologne (DE); Bernd Henning, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/479,083

(22) PCT Filed: Jan. 17, 2018

(86) PCT No.: PCT/EP2018/051088
§ 371 (c)(1),
(2) Date: Jul. 18, 2019

(87) PCT Pub. No.: WO2018/134239
PCT Pub. Date: Jul. 26, 2018

(65) Prior Publication Data
US 2019/0375635 A1 Dec. 12, 2019

(30) Foreign Application Priority Data
Jan. 20, 2017 (EP) .................... 17152417

(51) Int. Cl.
*C01B 7/04* (2006.01)
*C01B 7/07* (2006.01)
(Continued)

(52) U.S. Cl.
CPC .............. *C01B 7/04* (2013.01); *C01B 7/0706* (2013.01); *C02F 1/461* (2013.01); *C02F 1/66* (2013.01); *C02F 2101/12* (2013.01)

(58) Field of Classification Search
CPC .......... C01B 7/01; C01B 7/04; C01B 7/0706; C01B 7/07; C01B 7/075; C01B 32/80;
(Continued)

(56) References Cited

U.S. PATENT DOCUMENTS 3,929,411 A * 12/1975 Takano .............. G01N 35/1097
436/180
4,847,408 A * 7/1989 Frosch .................. C07C 263/20
560/347
(Continued)

FOREIGN PATENT DOCUMENTS

AT 234639 B 7/1964
EP 289840 B1 10/1990
(Continued)

OTHER PUBLICATIONS

International Search Report for PCT/EP2018/051088 dated Mar. 19, 2018.
(Continued)

*Primary Examiner* — Joseph W Drodge
(74) *Attorney, Agent, or Firm* — Faegre Drinker Biddle & Reath LLP

(57) ABSTRACT

The invention relates to a method for flexibly controlling the use of hydrochloric acid having an HCl concentration of at least 10 wt %, in particular at a volume flow rate of at least 1 m³/h, obtained from a continuous chemical production
(Continued)

Figure 1:
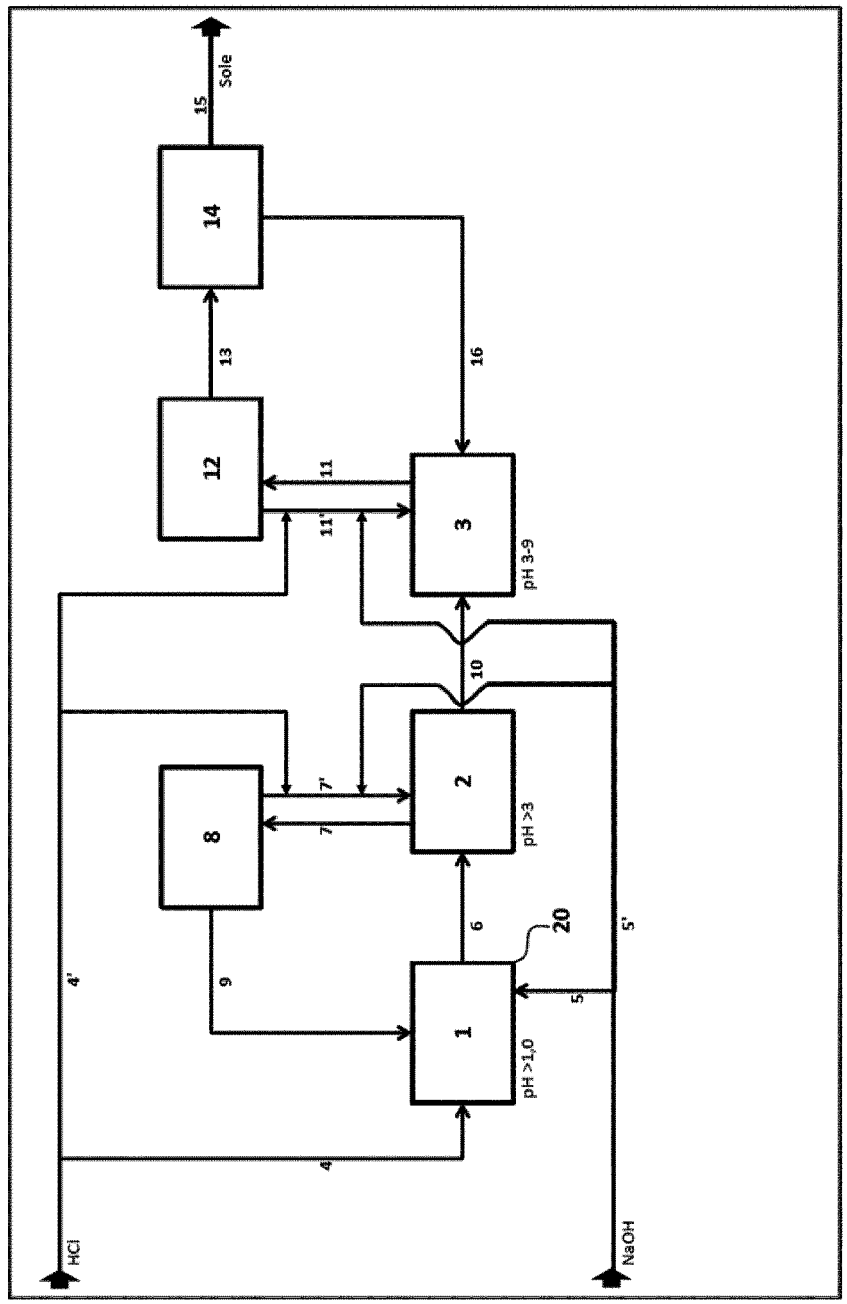

process (A). In the method, purified hydrochloric acid (54) from a hydrochloric acid store (E) is optionally fed to a dispatch station (H), an HCl electrolysis station (F) and a chloralkali electrolysis station (L), which are consumption points for the hydrochloric acid, or to a neutralisation station (G) in that if one or more of said consumption points (H, F, L) is not available or if there are bottlenecks at the consumption points (H, F, L), the hydrochloric acid (54) is fed to the neutralisation station (G) and neutralised with concentrated alkali solution (55), in particular with concentrated sodium hydroxide solution, and the resulting salt solution (56) is fed either to the chloralkali process station (L) or to a disposal station (M).

15 Claims, 6 Drawing Sheets

(51) Int. Cl.
*C02F 1/46* (2006.01)
*C02F 1/66* (2006.01)
*C02F 1/461* (2006.01)
C02F 101/12 (2006.01)

(58) Field of Classification Search
CPC ...... C01B 7/0743; C02F 1/66; C02F 2101/12; C02F 1/461; C02F 1/008; C02F 1/467; C02F 1/4672; C02F 1/4674; C02F 1/685; C02F 1/686; C02F 2209/02; C02F 2209/06; Y02W 90/20; B01F 15/00175; B01F 15/00207; B01F 15/0022; B01F 15/00253; B01F 15/00409; B01F 15/00412; C08F 14/06; C08F 114/06; C08F 214/06; C07C 21/04; C07C 21/06; G21F 9/32
USPC ............ 210/742, 743, 748.17, 754; 423/386, 423/419.1, 499.1, 499.4, 499.5, 645, 646; 366/151.1, 152.1, 152.2, 160.1, 162.1; 588/19
See application file for complete search history.

(56) References Cited

U.S. PATENT DOCUMENTS

| | | | |
|---|---|---|---|
| 5,015,457 A | 5/1991 | Langhoff et al. | |
| 5,616,234 A * | 4/1997 | Rhees | C02F 1/4674 205/500 |
| 5,770,035 A * | 6/1998 | Faita | C25B 1/26 205/640 |
| 6,719,957 B2 * | 4/2004 | Brady, Jr. | B01D 53/002 423/240 R |
| 8,153,838 B2 * | 4/2012 | Bulan | C07C 263/20 560/347 |
| 8,329,951 B2 | 12/2012 | Wloka et al. | |
| 9,150,490 B2 * | 10/2015 | Ooms | C07C 68/02 |
| 2004/0152929 A1 * | 8/2004 | Clarke | C07C 17/156 570/224 |
| 2007/0277551 A1 * | 12/2007 | Kamper | C01B 7/0743 62/617 |
| 2007/0286793 A1 * | 12/2007 | Weber | C01B 7/04 423/500 |
| 2008/0250715 A1 * | 10/2008 | Cooper | B01D 53/501 48/197 FM |
| 2010/0294727 A1 * | 11/2010 | Gilbeau | C01D 3/14 210/748.13 |
| 2011/0091366 A1 * | 4/2011 | Kendall | B01D 53/62 423/220 |
| 2014/0072653 A1 * | 3/2014 | Buschmann | C07C 407/00 424/613 |
| 2015/0104554 A1 * | 4/2015 | Wright | B01D 53/22 426/419 |
| 2017/0321330 A1 * | 11/2017 | Malhotra | C25B 1/26 |

FOREIGN PATENT DOCUMENTS

| | | |
|---|---|---|
| EP | 1743882 B1 | 2/2011 |
| EP | 2371806 A1 | 10/2011 |
| WO | WO-2008083997 A1 | 7/2008 |

OTHER PUBLICATIONS

Written Opinion of the International Searching Authority for PCT/EP2018/051088 dated Mar. 19, 2018.

* cited by examiner ial scale and also a plant for this purpose.
METHOD FOR FLEXIBLY CONTROLLING THE USE OF HYDROCHLORIC ACID FROM CHEMICAL PRODUCTION

CROSS-REFERENCE TO RELATED APPLICATIONS

This application is a national stage application (under 35 U.S.C. § 371) of PCT/EP2018/051088, filed Jan. 17, 2018, which claims benefit of European Application No. 17152417.6, filed Jan. 20, 2017, both of which are incorporated herein by reference in their entirety.

The invention relates to a method for flexibly controlling the use of hydrochloric acid from chemical production on an industrial scale and also a plant for this purpose.

The invention proceeds from industrial processes known per se for neutralizing hydrochloric acid which is formed, for example, as reaction by-product in the production of polymers or of polymer precursors.

In the production of chemical products in which chlorine is used as mediator, e.g. in the production of isocyanates as described in EP 289 840 B1 or polycarbonate as described in EP 2371806A, hydrogen chloride is formed and this has to be processed further for both ecological and economic reasons. Some methods have been described for this purpose. In particular, recycling by electrolysis, for example by means of HCl diaphragm electrolysis, HCl ODC electrolysis or catalytic gas-phase oxidation by means of oxygen, known as the Deacon process, are known methods for recovering chlorine from hydrogen chloride or hydrochloric acid.

In order to process the hydrogen chloride further, it has to be purified and possibly absorbed in water in order to produce hydrochloric acid.

The purification of hydrogen chloride can be carried out, for example as described in U.S. Pat. No. 6,719,957, by liquefaction and distillation. The condensed organic impurities can be removed in this way. EP 1743882 B1 also described the purification of hydrogen chloride over activated carbon, but other adsorbents are also possible.

The further processing of hydrogen chloride is carried out by absorption in water to give hydrochloric acid which can be stored, filtered and then recycled to give chlorine and hydrogen by hydrochloric acid electrolysis using a diaphragm (Hydrochloric Acid Electrolysis (2012), ThyssenKrupp Uhde GmbH, page 17: http://www.thyssenkrupplectrolysis.com/fileadmin/documents/brochures/Hydrochlorie_Acid_Electrolysis.pdf).

The absorption of hydrogen chloride to form hydrochloric acid can be carried out by various methods, e.g. as described in the Handbook of Chlor-Alkali Technology (2005), page 1364.

The purification of hydrochloric acid can be carried out by various methods. One method is the purification in which the hydrochloric acid is stripped by means of steam (Ullmann Encyclopedia of Industrial Chemistry, Vol. 18, 2002, Wiley-Val Verlag GrnbH & Co. KGaA, Weinheim, Hydrochloric Acid, p 191 ff., EP 1743882 B1, in particular claim 1).

EP 1743882 B1 also states that inorganic impurities are removed by means of chelating ion exchangers.

The purified hydrochloric acid can then be passed to recycling, i.e. the formation of chlorine, which is recirculated to the chemical process, in a hydrochloric acid electrolysis using a diaphragm or using gas diffusion electrodes.

If, on the other hand, the hydrogen chloride is already separated off from the chemical production process, it can be subjected in the Deacon process to a gas-phase oxidation and converted by means of oxygen into chlorine and water. This offtake position for hydrogen chloride can only be utilized when a Deacon process is available on site or in the near vicinity and hydrogen chloride is obtained from the chemical process.

However, the conversion in the Deacon process is not complete, so that the unreacted hydrogen chloride has to be separated off together with the water formed from the reaction product chlorine. The hydrochloric acid formed here likewise has to be passed to a suitable work-up or use. The Deacon process is a very economical, alternative recycling process.

However, the prior art does not describe how industrial quantities of hydrochloric acid or hydrogen chloride can be handled when the offtake places associated with the chemical production process are unavailable for a short time. Large volume streams of hydrogen chloride or hydrochloric acid of more than 1 $m^3$/h are formed in industrial processes and these have to be recycled, sold, i.e. passed to a further suitable use, or disposed of. Storage of relatively large amounts of hydrochloric acid is possible for only a limited time since the storage capacities are not made extremely large. Thus, a storage capacity of 750 $m^3$ of hydrochloric acid (30% strength by weight) is necessary for storing one day's hydrochloric acid production from an isocyanate plant, e.g. tolylene diisocyanate production (TDI), having an illustrative capacity of 100 000 t/a. The capital cost of storage capacities and also the increased maintenance requirement associated therewith considerably impair the economics of large-scale production. This is because the highly corrosive properties of hydrochloric acid require costly materials of construction for the storage vessels and a high maintenance expenditure.

Due to decreases in the sales/usage opportunities for hydrochloric acid, the restricted storage capacity and the limited recycling capacity, the chemical processes in which hydrogen chloride is formed may have to be shut down since the quantities of hydrochloric acid formed in these processes can no longer be disposed of. This results in tremendous economic damage.

Furthermore, chemical production facilities have frequently grown historically, i.e. the capacity of the chemical production such as isocyanate production or the electrolysis and also storages for hydrochloric acid are not completely matched to one another.

From the storage facility, part of the hydrochloric acid is alternatively also made available to other chemical processes and is usually transported by means of rail tank cars, ships or road transport vehicles to the further usage places. The hydrochloric acid is here taken from the running chemical production in which the hydrochloric acid is formed and sent to the storage facility via a transport station. Here, it is possible for critical situations in which larger amounts of hydrochloric acid than can be handled by the transport station have to be stored or recycled to occur.

This can be the case, for example, on holidays in which there are travel prohibitions for heavy goods vehicles and also in the case of high deep water for ship transport or lack of availability of rail tank cars or road transport vehicles. A failure in recycling processes can also lead to a dramatic excess of hydrochloric acid, which ultimately leads to the running chemical production having to be shut down.

The measure of larger dimensioning of storage tanks does not, as indicated above, represent an economical alternative solution to this technical problem. Depending on the dimensioning of the storage facilities, these may either be made much too large or too small. If large storage capacities are installed and are completely filled due to offtake bottlenecks, the stored hydrochloric acid can also not be sold on the market in the subsequent period of time since there are also only limited uptake capacities here.

To install a greater capacity of the abovementioned recycling processes is likewise a technically and economically undesirable procedure.

Thus, the production of the chemical processes which produce hydrogen chloride or hydrochloric acid as by-product would have to be throttled back or stopped in order to reduce the amount of hydrochloric acid funned. This would make the chemical process in turn less economical and the reduced production would lead to a lack of sales quantities of chemical products and to losses of sales and profits. In addition, many continuously operating production processes cannot always be shut down completely without damage. Thus, off-spec product batches and also increased wear on the plant components occur. Furthermore, most continuous production processes cannot be operated at reduced load since plant components such as pumps, heat exchangers, reactor volumes have not been designed for this.

Furthermore, the sale of hydrochloric acid is based on a very volatile market which secures the sale of large amounts of hydrochloric acid fully for only a short time. It is a logistical challenge to market corresponding amounts of hydrochloric acid in order to ensure the production of the corresponding amount of chemical products.

It is an object of the invention to establish a flexible hydrochloric acid management system which avoids shutdown or throttling back of the chemical production process which produces hydrogen chloride or hydrochloric acid as by-product.

The hydrogen chloride or the hydrochloric acid obtained are preferably sold after purification. Hydrochloric acid is of great importance as inorganic acid in the chemical industry. Hydrochloric acid is used, for example, in the work-up of ores and rock phosphate. It is used in the acid treatment of petroleum and natural gas sources and in metal processing for pickling, etching and soldering. As food additive, hydrochloric acid bears the designation E 507. If the hydrochloric acid can no longer be sold or transferred at the site where it is formed, the storage capacity is quickly exhausted. If sales do not recommence, alternative recycling processes have to be employed at an early juncture. These include HCl diaphragm electrolysis, HCl ODC electrolysis or gas-phase oxidation by the Deacon process.

If the hydrochloric acid can no longer be stored and no longer be sent to the market and the HCl recycling processes such as gas-phase oxidation, hydrochloric acid electrolysis such as HCl diaphragm electrolysis or HCl ODC electrolysis are operating at full load or unavailable and the hydrochloric acid can also no longer be taken up in chloralkali electrolysis, the only remaining route is to neutralize the hydrochloric acid. Since large volume streams of hydrochloric acid are present, the neutralization represents a technical challenge and can, in particular, be carried out as follows.

The chemical principles of neutralization are comprehensively described in the literature.

According to the Arrhenius concept (1887) and its extension by Bronsted-Lowry (1923), neutralization is the reaction between an acid and a base. Here, an acid is defined as a substance which can dissociate and release protons in aqueous solution with formation of hydronium ions or oxonium ions ($H_3O^+$). In contrast, a base is a substance which on dissociation in aqueous solution forms hydroxide ions ($OH^-$) and can take up protons (cf. MORTIMER, Charles E.; MÜLLER, Ulrich: *Chemie—Das Basiswissen der Chemie*. $8^{th}$ edition, 2001, p. 234 and 282).

In the context described, the discontinuous method of titration to determine a graph for depicting the pH is known for laboratory operation. Here, very small amounts of the base are added stepwise to a defined amount of an acid and the pH is determined by means of an indicator (cf. MORTIMER, Charles E.; MÜLLER, Ulrich: *Chemie—Das Basiswissen der Chemie*. $8^{th}$ edition, 2001, p. 311 f.).

WO2008083997A1 has disclosed a continuous process for neutralizing a reaction mixture containing hydrochloric acid after the production of diphenylmethanediamine (MDA), in which the neutralization of the acid is carried out using ammonia and separation of the reaction mixture into an aqueous phase and an organic phase is subsequently carried out. Here, separation of the ammonia from the aqueous phase by means of an oxide or hydroxide of an alkaline earth metal is possible in a further process step. As significant differences from the method of the present invention, it can be said that in the process of WO2008083997A1 the weak base ammonia (pH=9.4) is added as neutralizing agent to an acidic reaction mixture after the MDA reaction and, after the neutralization reaction, a separation of the organic phase from the aqueous phase is carried out in order for the two phases to be worked up separately or part of the quantity of ammonia used to be recovered by means of a reaction with milk of lime and subsequent distillation.

A further process engineering use of neutralization on an industrial scale is, for example, in the treatment of communal or process engineering wastewater which is preferably obtained as acidic mixed wastewater. Before introduction of the purified wastewater into the main outfall, a pH-neutral state (pH 7) is sought and is achieved by addition of strong acids and bases (usually sulfuric acid and sodium hydroxide or alternatively milk of lime) between computer and preliminary clarification. In addition, the addition of these substances serves to precipitate metal ions by formation of metal hydroxides. This procedure is also referred to as neutralization precipitation and generally takes place in continuous treatment plants. Here, average residence times of 15 minutes at an average throughput of 10 $m^3/h$ are sought and mixing is effected by means of slow-running mixing devices. However, the focus here is on the separation of metal hydroxides by sink processes, so that downstream separation processes are necessary (cf. HARTINGER, Ludwig: *Handbuch der Abwasser-und Recyclingtechnik*. $2^{nd}$ edition, 1991, p. 294 ff.).

Principles of process design and regulation technology may be found in the literature (cf. LIPTAK, Bela G.: *Instrument Engineers Handbook* $4^{th}$ edition, 2005, p. 2044 ff.). However, nothing can be read here in respect of the specific objective.

None of the known technical applications focuses on the neutralization of the strong acid hydrochloric acid with the strong base sodium hydroxide and the resulting process and instrumentation challenges associated with setting the pH at large amounts (in particular a volume flow of hydrochloric acid of at least 1 $m^3/h$), in particular at a variable hydrochloric acid input concentration and a variable hydrochloric acid input stream and also, in particular, in respect of the removal of the heat of reaction in a continuous and fully automated mode of operation.

The invention provides a method for flexibly controlling the use of hydrochloric acid having an HCl concentration of at least 10% by weight, in particular with a volume flow of at least 1 $m^3/h$, obtained from a continuous chemical production process, characterized in that the purified hydrochloric acid is supplied from a hydrochloric acid storage, optionally a transport station, an HCl electrolysis station or a chloralkali electrolysis station, which are offtake places for the hydrochloric acid, or a neutralization station, where on failure of one or more of the abovementioned offtake places or in the case of offtake bottlenecks at the offtake places, the hydrochloric acid is fed to the neutralization station and neutralized with concentrated alkali metal hydroxide, in particular concentrated sodium hydroxide, and the salt solution formed is optionally fed to the chloralkali electrolysis station or a disposal station.

The principle of the method will be described by way of example below with the aid of the overview in FIG. 5.

In a chemical production A, hydrogen chloride gas is formed and is either firstly fed to an HCl purification B or reacted directly with water in an HCl absorption C to form hydrochloric acid 44, The hydrogen chloride 42, 43 from the purification B can be fed to the HCl absorption C or the HCl gas-phase oxidation K.

The HCl gas purification B can preferably be carried out by condensation of the hydrogen chloride at low temperature and/or high pressure followed by purification by distillation or the purification is carried out by freezing out the impurities. The purified HCl fraction obtained can subsequently be purified further over activated carbon.

If an HCl absorption of the hydrogen chloride in water is carried out in an absorption unit C, the energy liberated can be utilized for generating steam within the absorption unit C and for removing impurities from the hydrochloric acid by means of this steam. In addition, the steam can be fed to the unit for stripping out impurities. A hydrochloric acid 44 having an HCl content of preferably 30% by weight is taken off from the absorption unit.

The absorption C is preferably carried out in only one apparatus. As an alternative, other absorption methods as described in the prior art can also be used. For this purpose, for example, steam is fed in at the bottom of a column. The hydrogen chloride to be absorbed is introduced in the middle part of the column and the absorption solution, a hydrochloric acid 48 having a concentration of 1-25% by weight, preferably 15-25% by weight, of hydrochloric acid is fed into the column at the top. The hydrochloric acid 48 introduced can originate in its entirety or in part from a low-concentration hydrochloric acid which has been taken from the HCl electrolysis (F), e.g. by the diaphragm process or the HCl ODC process. The absorption process is, in particular, carried out adiabatically. At the upper part of the absorption column of the absorption C, impurities such as solvent or organic impurities or, when the chemical process is isocyanate production, also residues of phosgene can be taken off. A 26-36% strength by weight hydrochloric acid 44, preferably a 30% strength by weight hydrochloric acid, is taken off from the column and optionally passed to the hydrochloric acid purification D.

The hydrochloric acid 44 obtained can, for example, be purified by means of activated carbon in the hydrochloric acid purification D. Alternative purification methods such as distillation, stripping with steam, extraction or treatment with other absorbents are likewise possible. The content of organic impurities for further use, e.g. in electrolysis, both the hydrochloric acid electrolysis and the NaCl electrolysis, should be, measured as TOC (total organic carbon) content, less than 100 mg/kg, preferably less than 10 mg/kg. The hydrochloric acid usually also has to be present in purified form for other uses of the hydrochloric acid.

The hydrochloric acid obtained from the purification D can be fed to a storage facility E. The hydrochloric acid storage facility E can function as a distribution point, but it does not have to be exclusively such. It is likewise conceivable for the offtake places hydrochloric acid electrolysis F, NaCl electrolysis L or other hydrochloric acid consumers at the site (not shown) to take the hydrochloric acid directly. However, a buffer in the form of a storage facility E is preferably located in between.

One of the offtake places for hydrochloric acid is, for example, the hydrochloric acid electrolysis F. The hydrochloric acid electrolysis F can be carried out by the diaphragm process or the hydrochloric acid ODC process as described in the prior art. The installed electrolysis capacity determines the amount of hydrochloric acid taken up. Hydrochloric acid which cannot be recycled by means of electrolysis to form chlorine 58 and optionally hydrogen 59 has to be stored in the storage facility E. The chlorine 58 and optionally the hydrogen 59 originating from the hydrochloric acid electrolysis are fed in their entirety or partly back to the production process A. The depleted hydrochloric acid 48 from the hydrochloric acid electrolysis F is fed back to the HCl absorption unit C and reacted, as described above.

Chemical production processes which can be employed in the novel method are, in particular, a production process for chlorinating organic compounds (e.g. production of vinyl chloride), a process for phosgene production and phosgenation, e.g. for production of isocyanates, particularly preferably of methylene diisocyanate (MDI), tolylene diisocyanate (TDI), or a process for producing polycarbonate (PC) or a process for incinerating chlorine-containing wastes.

However, the novel method can in principle be employed in all cases of chemical production in which large industrial quantities of hydrogen chloride or hydrochloric acid are formed as by-product.

A preferred process is therefore characterized in that hydrochloric acid is converted into chlorine in the HCl electrolysis station, and the chlorine is recycled to the chemical production process and chemically reacted there.

A further offtake place for the hydrochloric acid from the storage facility E can be the NaCl electrolysis L (stream 54c) or else the neutralization C (stream 54) or the transport station H (stream 54b).

The capacity of a large-scale chemical production, e.g. of an isocyanate, is usually more than 50 000 t/a per plant, with plant capacities of up to 400 000 t/a at one site being quite normal. Hydrogen chloride streams of more than 4 t/h are produced here. If a chloralkali electrolysis L is present at the site, a substream of purified hydrochloric acid can be used for acidifying the brine or for decomposing sodium hypochlorite. However, the amounts for this use are small. Thus, a chloralkali electrolysis having a capacity of 400 000 t/a of chlorine has a hydrochloric acid requirement of from about 0.9 t/h to 1.4 t/h of 100% HCl. In the case of a tolylene diisocyanate (TDI) plant having a capacity of 100 000 t/a of TDI, about 231 t/h of 100% HCl are formed, so that only about 0.5% of the amount of HCl can be used in the chloralkali electrolysis for acidification of the electrolytes.

If the hydrochloric acid is used in the NaCl electrolysis, this is also recycled to chlorine there and can thus be recirculated to the production process A. In this way, the materials of value circuits are always closed further, as a result of which the production process A can produce with lower emissions.

Preference is therefore also given to a variant of the novel process which is characterized in that alkali metal chloride, in particular sodium chloride, optionally obtained from the neutralization G, and unneutralized hydrochloric acid for acidifying the alkali metal chloride solution, is converted into chlorine in the chloralkali electrolysis station L, and the chlorine is recycled to the chemical production process A and chemically reacted there.

The purified hydrochloric acid is preferably sent for sale via the transport station H or supplied to the NaCl electrolysis L or optionally also other hydrochloric acid users (not shown) on the site. Further recycling methods are the hydrochloric acid electrolysis F and the Deacon process K.

Hydrochloric acid can be taken from the storage facility F in order to be used in various applications. Thus, the hydrochloric acid can be converted into chlorine and hydrogen and chlorine and water in a hydrochloric acid electrolysis F, e.g. by the diaphragm process or by the HCl ODC process. If the capacity of the electrolysis F is limited, part of the purified hydrochloric acid has to be conveyed from a hydrochloric acid storage facility to a transport station H. Here, it can be loaded onto a road transport vehicle 43, rail tank cars 44 or a ship 45. A further possible destination for the hydrochloric acid from the storage facility would be use in a chloralkali electrolysis L. If the abovementioned output routes are no longer available or their capacity has been exhausted, the hydrochloric acid from the storage facility F is, according to a preferred embodiment of the invention, fed to a neutralization station G in which the hydrochloric acid is reacted with sodium hydroxide to give a, preferably saturated, sodium chloride solution. This sodium chloride solution 56 is preferably reused in an chloralkali electrolysis L or has to be disposed of as stream 56a via a disposal station M.

A substream or even the entire stream of the hydrogen chloride 43 which has been purified in the purification station B can be fed to catalytic oxidation using oxygen, namely the HCl gas-phase oxidation by the Deacon process K. This forms chlorine 58a and, from unreacted hydrogen chloride, a 20-36% strength hydrochloric acid 49, preferably a 30% strength hydrochloric acid.

Part or all of the chlorine 58a from the HCl gas-phase oxidation K is fed back to the chemical production A. The hydrochloric acid 49 can, depending on its quality, be fed to the hydrochloric acid purification D or directly to the hydrochloric acid storage facility E and if necessary the neutralization G and/or the NaCl electrolysis L and/or an HCl electrolysis F and/or a transport station H.

The linking of the HCl gas-phase oxidation K with the further utilization of various hydrochloric acid uses, in particular the hydrochloric acid electrolysis F, represents a very efficient variant of the HCl gas-phase oxidation K. This linking is particularly efficient since HCl gas can be obtained from the hydrochloric acid obtained in the HCl gas-phase oxidation only with an extremely high outlay, so that the purposeful utilization of this hydrochloric acid is desirable.

A multistage, in particular three-stage, neutralization process is preferably employed in the neutralization station G in the novel method.

A type of multistage neutralization which is preferred for the novel method will be described in the following sections.

A specific object of the invention is to provide a continuous neutralization process for flexibly controlling the use of hydrochloric acid from chemical production in large amounts, which can cope on an industrial scale with the variable operational requirements in respect of input concentration and amount of hydrochloric acid in a continuously operating and fully automated neutralization process using sodium hydroxide while adhering to the target process parameters pH and temperature. Here, a particular object is regulating the pH which has a logarithmic dependence on the concentration of hydronium ions in the aqueous solution.

In particular, a further particular technical object is to automatically equalize process-related pressure fluctuations in the method steps preceding the neutralization and thus associated mass flow fluctuations in a particular tolerance window.

The particular object is achieved by the neutralization of hydrochloric acid having a volume flow of at least 1 $m^3$/h by means of alkali metal hydroxide being carried out in at least 3 reaction stages, which comprise a rough setting, fine setting and final setting of the pH and comprise in each case cooled, recirculated substreams of the reaction mixture from stage to stage, with these taking up the respective heat of reaction in these stages. To ensure the desired pH at the end, homogenization of the solution of the starting materials and also the various reaction mixtures following them in the process sequence has to be ensured.

In particular, a concept made up of three reaction stages, which allows the metered addition of the required neutralization amounts taking into account the maximum pH jump in a reaction stage and takes account of the maximum usable concentrations of the starting materials, is employed in order to realize the target pH. This three-stage method makes it possible to satisfy the requirements in terms of the amounts introduced based on the required residual amount of neutralizing agent to the target pH. Accordingly, the metering capacity decreases with increasing reaction stage numbers. The decreasing metering capacity is reflected in the choice of the metering valves.

Preference is given to a method in which the neutralization G is carried out in the form of a multistage, in particular triple, continuous neutralization of hydrochloric acid having an HCl concentration of at least 10% by weight and having a volume flow of at least 1 $m^3$/h, preferably at least 5 $m^3$/h, to a target pH in the range from 3 to 9, by means of the following steps:

A) introduction of the hydrochloric acid 4 to be neutralized and a proportion of at least 95%, preferably at least 99%, of the stoichiometrically required alkali metal hydroxide 5 in a first stage 1 into a volume flow 9 of neutralized hydrochloric acid, which is recirculated, cooled, from a second stage 2, subsequent mixing of the streams 4, 5, 9 and full reaction of the primary reaction mixture 18a in a neutralization and resident zone 17a, where the pH of the stream 6 coming from the first stage 1 has a pH of at least 1 and the volume flow 9 which is recirculated cooled from the second stage 2 corresponds to at least 3 times the hydrochloric acid volume flow which is fed into the first stage 1, B) transfer of the volume flow 6 from the first stage 1 into a neutralization zone 17b of the second neutralization stage 2, further setting of the pH of the secondary reaction mixture 18b to a value of preferably pH 3 by addition of alkali metal hydroxide 5' or hydrochloric acid 4' in a secondary circuit 7' at the metering points 7" and 7''', where this secondary circuit 7' results from offtake of a substream from the main stream 7 to be cooled of the second reaction stage 2 and the ratio of the volume flow 7 of the neutralized hydrochloric acid to the volume flow of the substream 7' is at least 10:1 and, after cooling 8 of the main stream in the second stage, recirculation of a further larger substream 9 of the secondary reaction mixture 18h of the second stage 2 into the first neutralization stage 1 for carrying out the reaction A), C) introduction of a further substream 10 from the secondary reaction mixture 18b of the second reaction stage 2 into a neutralization zone 17c of a third neutralization stage 3, further setting of the pH of the tertiary reaction mixture 18$c$ in the third neutralization stage 3 to a pH in the range from pH 3 to pH 9 by addition of alkali metal hydroxide 5' or hydrochloric acid 4' in particular at the metering points 11" and 11''' in a further secondary circuit 11' which is connected to the neutralization zone 17$c$, where this secondary circuit 11' consists of a smaller substream of the main stream 11 of the reaction mixture 17$c$ exiting from the third stage, which is passed to cooling 12, and the larger substream 13 of the main stream 11 exiting from the third stage is, after cooling 12, passed to final quality control for temperature and pH monitoring and, if the cooled stream 13 of the tertiary reaction mixture 18$c$ satisfies the predetermined quality criteria, this stream 13 is taken off as product stream 15, or otherwise the tertiary reaction mixture 18$c$ is to be introduced as recycle stream 16 into the third stage 3 for further pH adjustment.

In a preferred embodiment of the novel method, sodium hydroxide is used as neutralizing agent (alkali metal hydroxide) in the neutralization G. Sodium hydroxide having a content of NaOCl of less than 100 ppm is preferably used as neutralizing agent.

The novel method is preferably carried out in such a way that the average residence time of the reaction mixture 18$a$ in the first neutralization stage 1 in the neutralization G is from 20 s to 3 minutes.

The average residence time of the secondary reaction mixture 18$b$ in the second neutralization stage 2 in the neutralization G is, in a further preferred embodiment of the method, from 15 to 100 minutes.

The average residence time of the tertiary reaction mixture 18$e$ in the third neutralization stage 3 in the neutralization G is, in another preferred embodiment of the novel method, from 45 to 250 minutes.

A particularly preferred variant of the novel neutralization process G is characterized in that, independently of one another, the temperature of the primary reaction mixture 18$a$ at the outlet from the first stage 1 is set to a value in the range from 45° C. to 80° C., preferably from 65° C. to 70° C., the temperature of the secondary reaction mixture 18$b$, which is measured directly in the second reaction stage 2, is set to a value in the range from 40° C. to 75° C., preferably from 60° C. to 65° C., and the temperature of the tertiary reaction mixture 18$c$ at the output from the cooling of the third stage 12 is set to a value in the range from 15° C. to 55° C., preferably from 25° C. to 50° C. Here, the target temperature of the tertiary reaction mixture 18$c$ in the product stream 15 on leaving the plant is particularly preferably not more than 30° C.

In a preferred embodiment of the invention, a particular arrangement of static mixer and mixing nozzles is used in the neutralization G. In the first reaction stage, the two input streams are for this purpose joined in order subsequently to obtain a homogeneous reaction mixture in a comparatively short time.

A further particularly preferred embodiment of the neutralization U is therefore characterized in that the mixing of the streams 4, 5, 9 in the first neutralization stage 1 is carried out in a static mixer, where the static mixer has a mixing quality of at least 98%, preferably 99%.

For the present purposes, the quality feature mixing quality is the ratio of the volume having a homogeneous distribution of sodium hydroxide, hydrochloric acid and the reaction product thereof to the total volume. In this context, the objective of homogeneity means that each sample reflects a composition which corresponds to the totality. The mixing quality is established as a function of the volume flow and the resulting pressure drop at the mixing elements which generate transverse mixing owing to the turbulence in the mixing tube and is determined at a distance of 4 tube diameters downstream of that mixing element. Here, the distance downstream of the contact point of the fluids to be mixed to attainment of the mixing quality is referred to as mixing distance.

In a particular embodiment of the neutralization G, the static mixer is followed by a downstream vessel which, owing to its volume, provides a residence time 17$a$ for full reaction of the reaction mixture of the first stage 18$a$. The effect of homogenization of the reaction mixture is thus reinforced further. In addition, this is necessary in order to be able to carry out a reliable pH measurement for the reaction mixture 18$a$.

In both further stages B) and C) ($2^{nd}$ and $3^{rd}$ reaction stages) in the neutralization G, mixing nozzles, in particular, are provided in order firstly to mix the inflowing mass streams and secondly to bring about homogenization within the reaction vessel.

A preferred variant of the neutralization G is characterized in that a buffer volume in the range of about 25% of the usable vessel volume is provided in the neutralization zone 17$b$ and/or in the neutralization zone 17$c$ in order to compensate for fluctuations in the inflow volume stream.

The neutralization G is particularly preferably configured so that the mixing of the secondary reaction mixture 18$b$ with the substream 4', 5', 7' and the mixture of the tertiary reaction mixture 18$c$ with the substream 4', 5', 11' are carried out independently of one another using stirring tools 19 in the neutralization zone 17$b$ or 17$c$ or by means of mixing nozzles 20 which are provided in the entry region of the feed conduits for the substreams 7' or 11' into the neutralization zone 17$b$ or In all stages, the metering valves for the introduction of sodium hydroxide are, in particular, duplicated in order to be able to carry out introduction of very precise amounts. Accordingly, there is a rough metering device and a small valve for fine adjustment in each neutralization stage. For the addition of hydrochloric acid, this duplication of the metering devices is not absolutely necessary when, in particular, an intended value is set in the first stage and only an overswing of the pH is countered in the other stages and there is no specific regulation task in the stages.

Furthermore, it is helpful, in a preferred embodiment of the neutralization G, to ensure a particular residence time for the reaction of sodium hydroxide and hydrochloric acid. Appropriate residence times in the reaction stages are provided for this purpose. Since the static mixer which is preferably to be used in the first stage generates virtually no residence times, a residence vessel is installed downstream of the static mixer. This makes it possible for the reaction mixture to react fully and increases the informativeness of the pH measurement after the first stage. The same technical necessity applies to the provision of appropriate residence times in the second and third stages, but in contrast to the first stage these have been realized, in particular, by means of integrated reaction vessel volumes. This has the additional advantage of buffering capability of the system in case of disturbances in the process parameters of the input streams and thus prevents direct shutdown of the plant when this process window is departed from. The volumes of the second and third reaction vessel have been, in a preferred embodiment, selected so that resonant oscillation of the pH regulations is avoided (resonance catastrophe).

The overall plant for carrying out the neutralization G is, in particular, configured as contiguous plant and is designed for continuous operation without the necessity of interrupting the flow through the plant owing to reaction times or changeover times. Thus, continuous processing of hydrochloric acid can be ensured and load limitations or fluctuations of preceding processes do not have to be feared.

The heat arising in the neutralization reaction is, in particular, removed stepwise by means of cooling water coolers via separate circuits in the second and third reaction stages. Here, in the second stage, a substream is also recirculated for cooling purposes to a point upstream of the first stage. For transport of the reaction mixture to the heat exchangers, circulation pumps which additionally lead to a mixing effect firstly within the apparatus (by rotation of the rotor) and secondly by recirculation to the vessels are typically used. These measures ensure, in particular, that limits associated with materials of construction are adhered to and the neutralized wastewater produced is within the respective specified requirements and can thus be utilized for further processes.

In the novel method, alkali metal hydroxide, in particular sodium hydroxide having a content of NaOCl of less than 100 ppm, is used in a preferred embodiment of the neutralization G so that there is not formation of free chlorine during the reaction, which would in turn require the use of a reducing agent. The concentration of the sodium hydroxide is preferably at least 15% by weight, particularly preferably at least 25% by weight, very particularly preferably at least 30% by weight.

If necessary, the alkali metal hydroxide used in the neutralization G, preferably sodium hydroxide, is admixed with a reducing agent, preferably sodium bisulfite, before use in order to set the abovementioned maximum content of NaOCl. As an alternative, the reducing agent can also be added to the stream of alkali metal hydroxide, in particular sodium hydroxide, in the second neutralization stage of the neutralization G.

The invention will be illustrated below with the aid of the figures and the examples, but these do not represent any restriction of the invention.

The figures show:

FIG. 1 a schematic view of a three-stage neutralization G of hydrochloric acid

Figure 2:
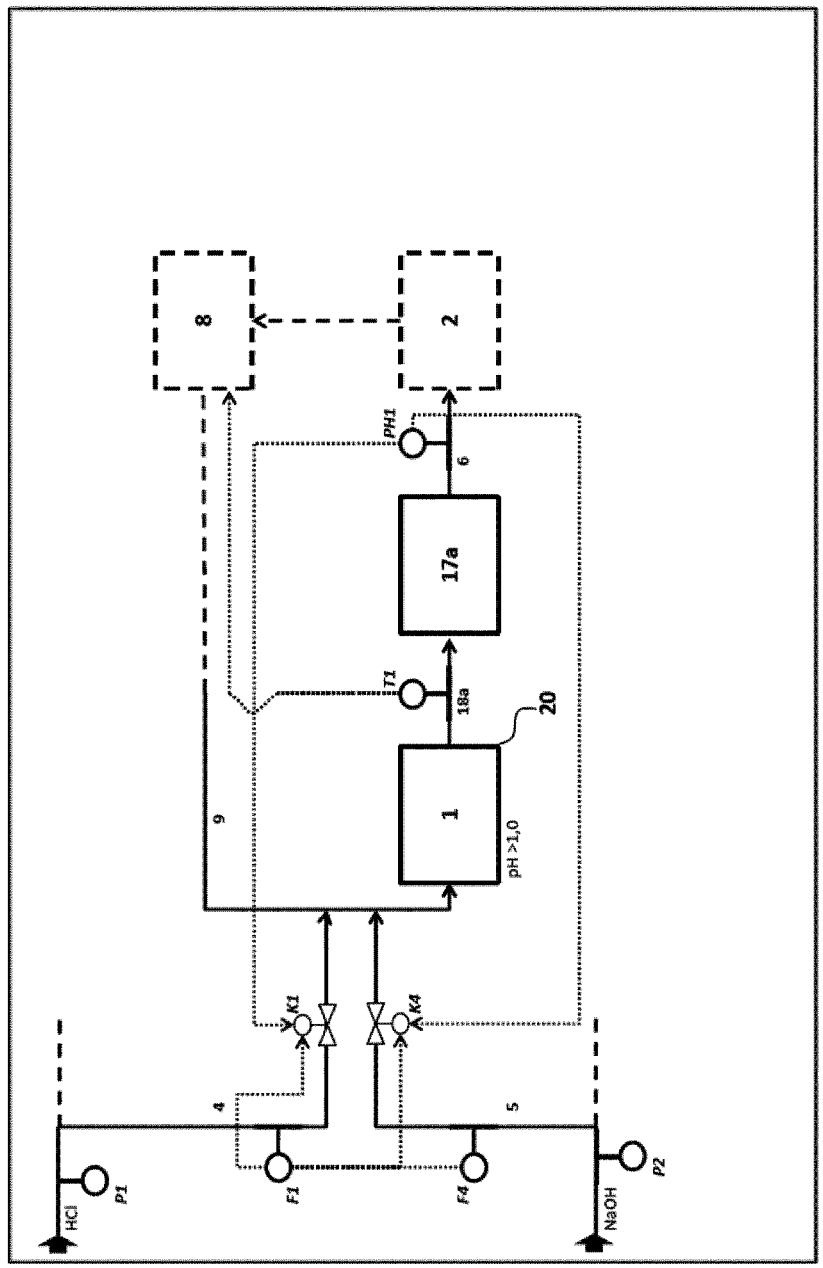

FIG. 2 schematic view of details of the first neutralization stage

Figure 3:
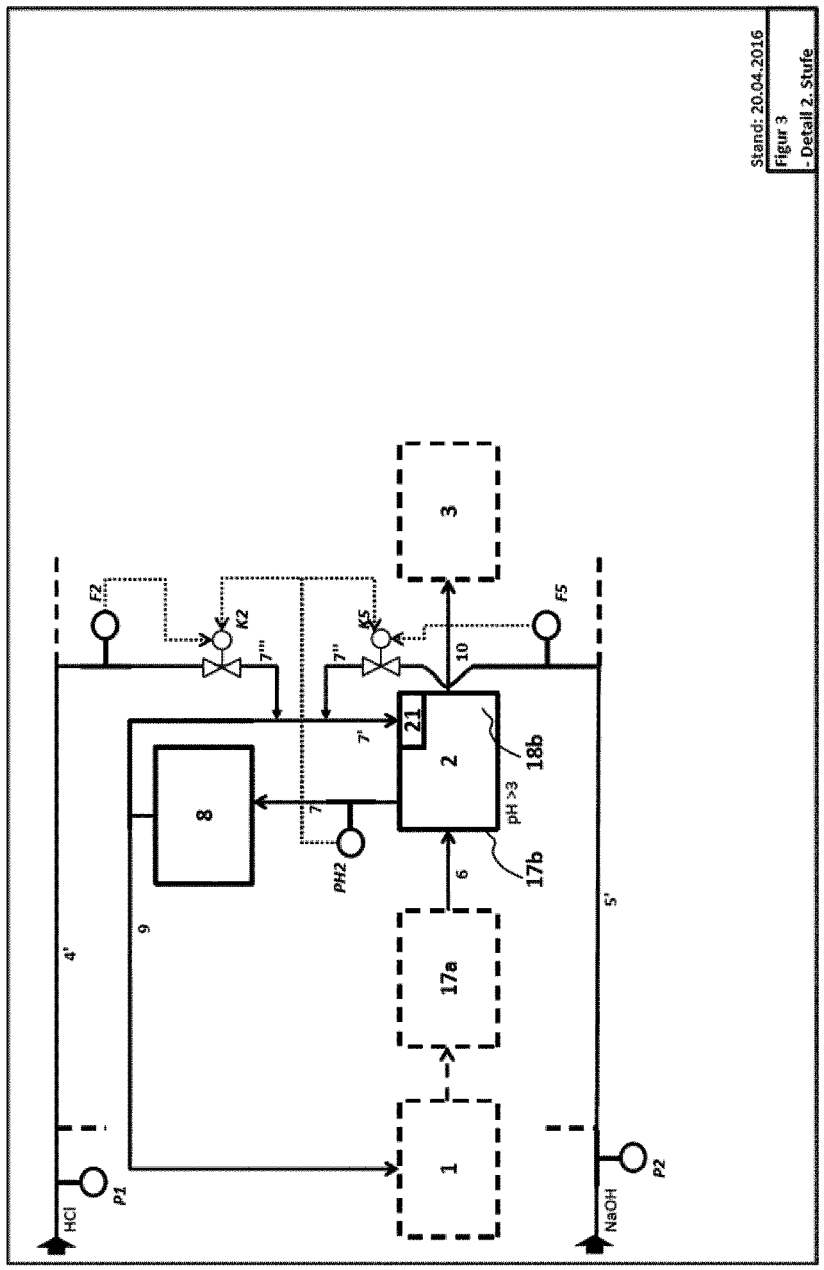

FIG. 3 schematic view of details of the second neutralization stage

Figure 4:
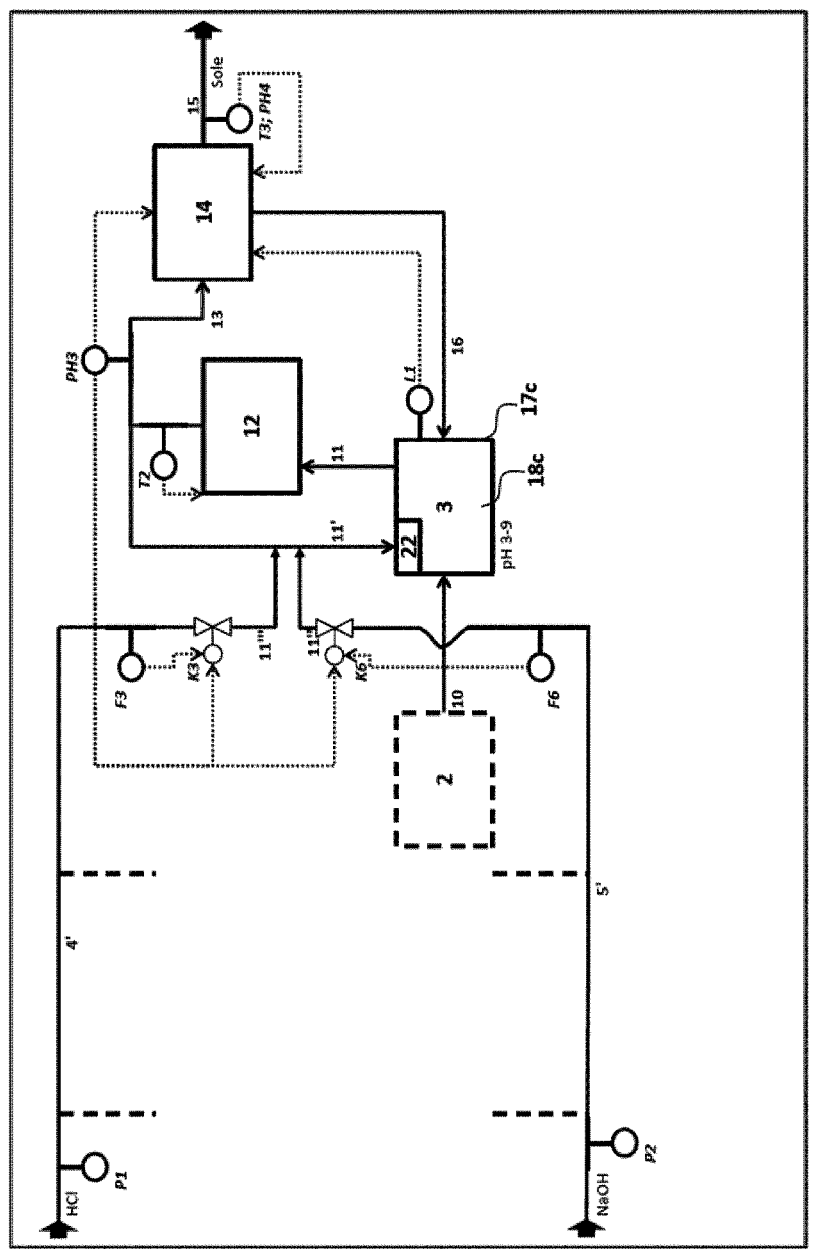

FIG. 4 schematic view of details of the third neutralization stage

Figure 5:
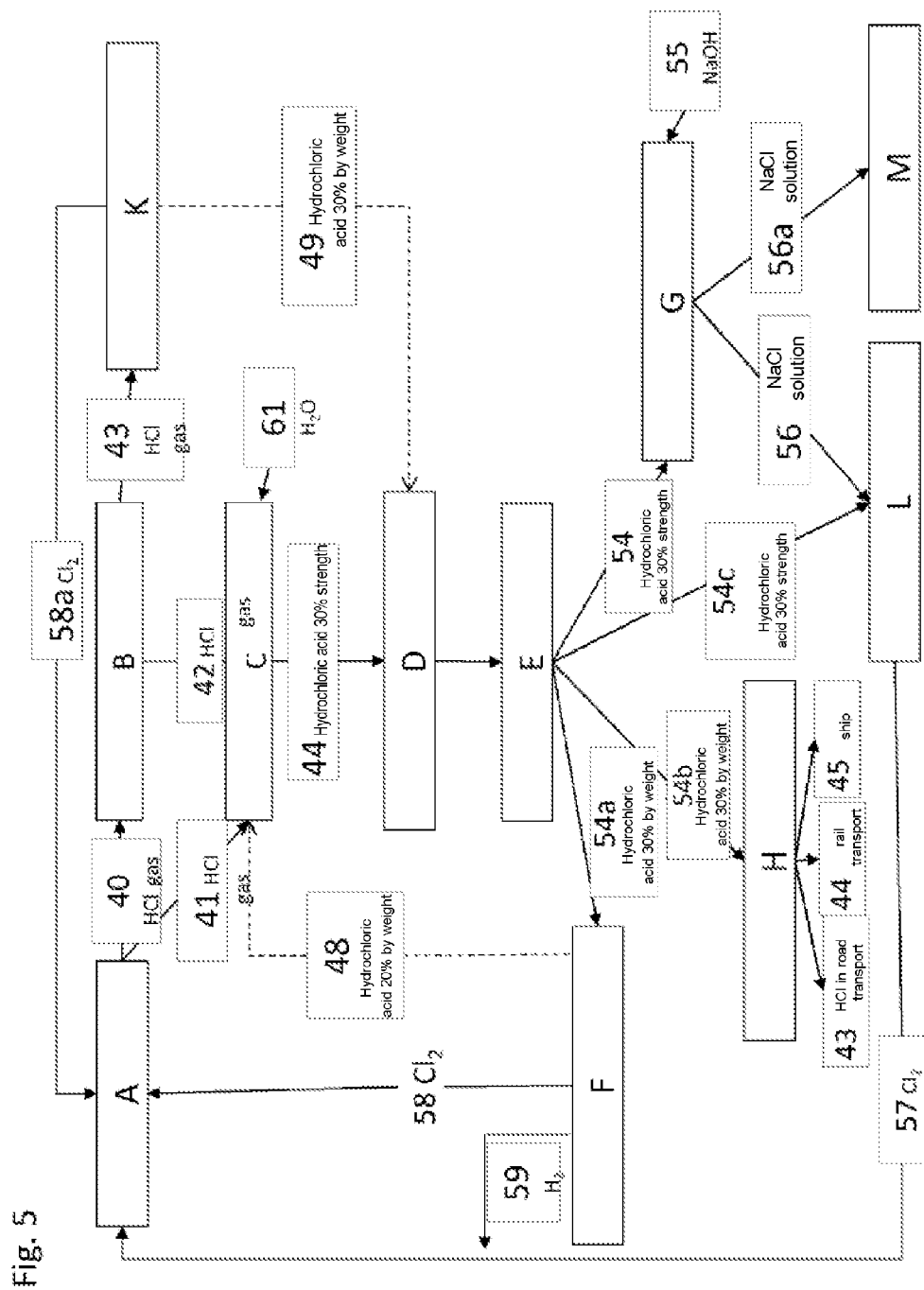

FIG. 5 a schematic view of the total process for hydrochloric acid management

Figure 6:
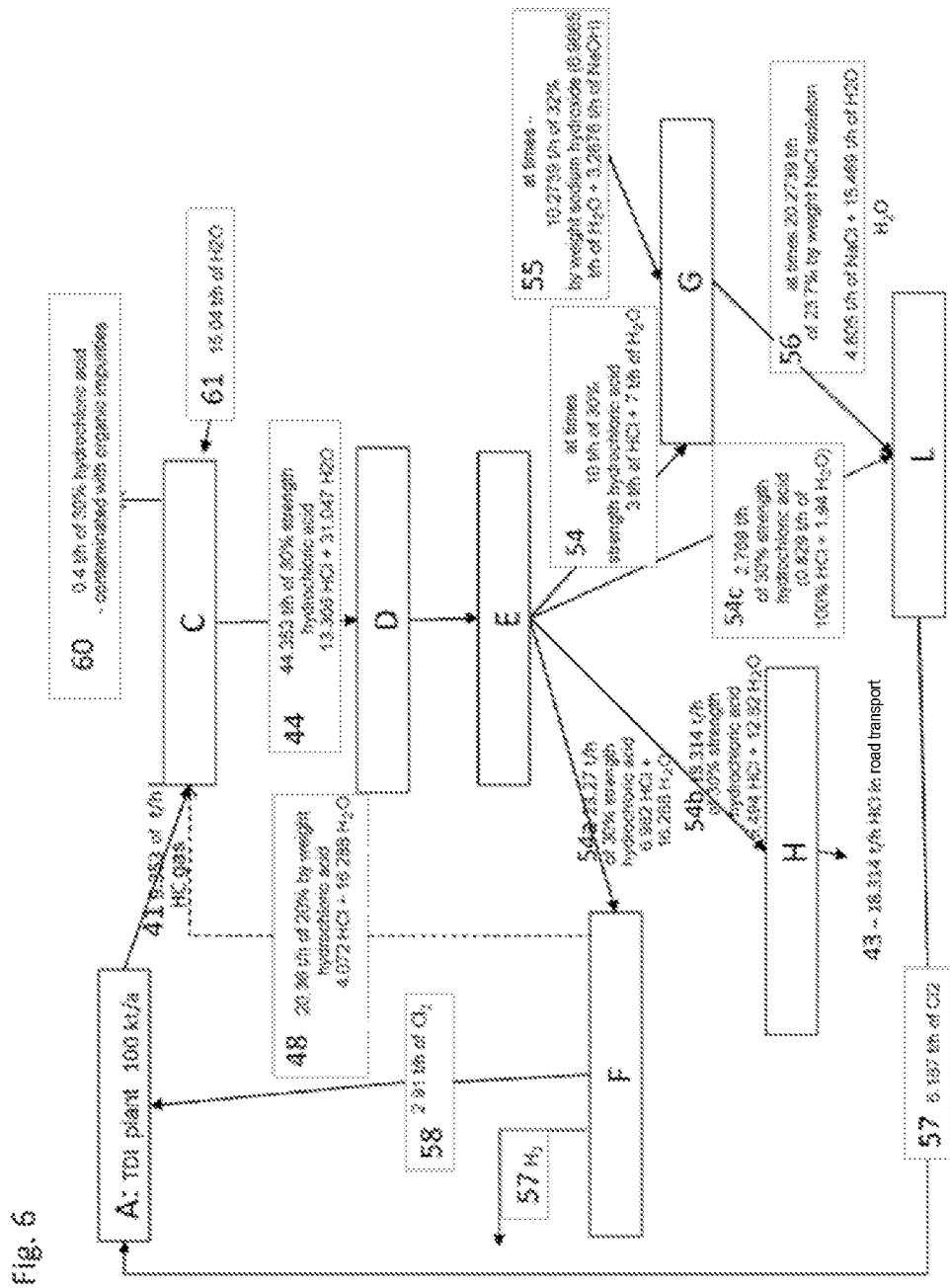

FIG. 6 a schematic view of a particular embodiment of hydrochloric acid management In the figures, the reference symbols have the following meanings 1 first neutralization stage
2 second neutralization stage
3 third neutralization stage
4 hydrochloric acid to the neutralized
4' hydrochloric acid stream for setting the target pH in $2^{nd}$ and $3^{rd}$ stage
5 sodium hydroxide
5' sodium hydroxide stream for setting the target pH in $2^{nd}$ and $3^{rd}$ stage
6 reaction mixture exiting from the first stage
7 main stream from the second neutralization stage
7' smaller secondary circuit of partially neutralized hydrochloric acid from main stream 7
7" introduction of sodium hydroxide into the secondary circuit of the second neutralization stage
7'" introduction of hydrochloric acid into the secondary circuit of the second neutralization stage
8 cooling of the first and second neutralization stage
9 recirculation of cooled reaction mixture of the second stage
10 reaction mixture exiting from the second stage
11 reaction mixture exiting from the third stage
11' smaller secondary circuit of neutralized hydrochloric acid from stream 11
11" introduction of sodium hydroxide into secondary circuit of the third neutralization stage
11'" introduction of hydrochloric acid into secondary circuit of the third neutralization stage
12 cooling of the third neutralization stage
13 cooled reaction mixture of the third stage
14 monitoring of the release criteria or quality of the product stream
15 discharged product stream from the neutralization in the quality window
16 recirculated reaction mixture outside the quality window
17a residence time and neutralization zone downstream of the first stage
17b neutralization zone of the second stage
17c neutralization zone of the third stage
18a (primary) reaction mixture of the first stage
18b (secondary) reaction mixture of the second stage
18c (tertiary) reaction mixture of the third stage
20 static mixer of the first stage
21 mixing nozzles of the second stage
22 mixing nozzles of the third stage
F1 flow measurement of hydrochloric acid feed to first neutralization stage
F2 flow measurement of hydrochloric acid feed to second neutralization stage
F3 flow measurement of hydrochloric acid feed to third neutralization stage
F4 flow measurement for sodium hydroxide feed to first neutralization stage
F5 flow measurement for sodium hydroxide feed to second neutralization stage
F6 flow measurement for sodium hydroxide feed to third neutralization stage
K1 regulating device for hydrochloric acid feed to first neutralization stage
K2 regulating device for hydrochloric acid feed to second neutralization stage
K3 regulating device for hydrochloric acid feed to third neutralization stage
K4 regulating valve pair for sodium hydroxide feed to first neutralization stage
K5 regulating valve pair for sodium hydroxide feed to second neutralization stage
K6 regulating valve pair for sodium hydroxide feed to third neutralization stage
P1 inflow pressure measurement for hydrochloric acid
P2 inflow pressure measurement for sodium hydroxide
PH1 pH measurement after first neutralization stage for pH regulation
PH2 pH measurement after second neutralization stage for pH regulation
PH3 pH measurement after third neutralization stage for pH regulation PH4 monitoring of target pH
T1 temperature measurement after first neutralization stage for cooling water regulation
T2 temperature measurement after third neutralization stage for cooling water regulation
T3 monitoring of target temperature
A chemical production (isocyanate production)
E hydrochloric acid storage facility
F HCl electrolysis station
G neutralization station
L chloralkali electrolysis station
M disposal station
40, 41 hydrogen chloride
42, 43 purified hydrogen chloride
44, 49 hydrochloric acid, crude
48 hydrochloric acid, 20% by weight
54, 54a, 54b, 54c purified hydrochloric acid
55 conc, sodium hydroxide
56, 56a salt solution
57, 58 chlorine
59 hydrogen gas
60 hydrochloric acid, unpurified
61 water

EXAMPLES

The following examples illustrate the flexible hydrochloric acid management.

Example 1

Description of a Multistage Neutralization

The integrated system of hydrochloric acid management at a production site is shown schematically in FIG. 5.

A chemical production plant A forms HCl gas which is fed to station B for gas purification, in particular by means of distillation, freezing-out of impurities and purification over activated carbon (gas stream 40). The purified hydrogen chloride gas 42 is fed to a station C for hydrogen chloride absorption, which operates by means of steam stripping. Part of the purified hydrogen chloride gas 43 is fed to a plant K for catalytic gas-phase oxidation, in which hydrogen chloride is reacted with oxygen in the presence of catalysts containing ruthenium compounds at elevated temperature to form chlorine 58a and water or hydrochloric acid 49. The chlorine gas 58a is recirculated to the production A for reaction.

If desired, an HCl gas stream 41 can also be fed directly to the station C for hydrogen chloride absorption.

Hydrochloric acid 44 from the HCl absorption C and optionally excess hydrochloric acid 49 from the HCl gas-phase oxidation K are fed to a station D for purification of hydrochloric acid, which removes further impurities, for example by means of activated carbon. The purified hydrochloric acid is conveyed further to a hydrochloric acid tank E as hydrochloric acid storage facility. When the capacity of the hydrochloric acid tank E is exceeded, hydrochloric acid 54 is conveyed either from the hydrochloric acid tank E or directly from the station D for purification of hydrochloric acid to the neutralization station C (not shown) and neutralized there by means of concentrated sodium hydroxide 55. The salt solution 56 formed here can be fed preferably to a plant L for electrolysis of sodium chloride or in a stream 56a to a disposal station M. In the NaCl electrolysis station L, part of the hydrochloric acid 54c from the storage facility E can be used for acidifying the sodium chloride solution. The chlorine 57 formed in the electrolysis L is passed to reuse in the chemical production A.

A further output station for the hydrochloric acid 54b is the transport station H in which the hydrochloric acid is loaded onto either road transport vehicles (stream 43), rail tank cars (stream 44) or ships (stream 45).

Here too, a hydrochloric acid electrolysis station F in which part of the purified hydrochloric acid 54a from the hydrochloric acid storage facility E is converted into chlorine gas 58, optionally hydrogen 59 and depleted hydrochloric acid 48 is provided at the production site. The chlorine gas 58 is if required recirculated to the chemical production A, the hydrogen 59 is utilized thermally or in another way and the depleted hydrochloric acid 48 is fed to the HCl absorption C.

The neutralization station U is taken into operation when the capacity of the hydrochloric acid storage facility E is exhausted and the other recycling possibilities hydrochloric acid electrolysis F, sodium chloride electrolysis L and sales or transport H are not possible for various reasons.

After start-up of the cooling and pump circuits and also activation of the starting material supply, the neutralization plant is ready for operation (FIG. 1). An operating pressure of 6.3 bar/0.63 MPa prevails at the measurement position P2 for the 32% strength sodium hydroxide used and an operating pressure of 5.4 bar gauge/0.54 MPa prevails at the measurement position P1 for the 31% strength hydrochloric acid to be neutralized. An intended value for the hydrochloric acid stream to be neutralized is set in the process control system by the operating personnel. A hydrochloric acid feed stream 4 having a volume flow of 30.0 m$^3$/h is introduced into the recycle stream of cooled reaction mixture of the second stage 9. According to a ratio regulation F1 and F2 and the pH regulation of the first stage PH1, an amount of 28.5 m$^3$/h is metered via the regulating valve pair of the sodium hydroxide feed of the first neutralization stage K4 into the stream from 9 and 4. Each total volume stream of 179 m$^3$/h subsequently went into a static mixer 20 which represents the mixing device of the first neutralization stage 1. After passage through intensive homogenization, the temperature T1 is measured downstream of the static mixer in order to regulate the cooling water flow for the cooling of the first and second stage 8. A temperature of 65.4° C. is established at this position. The primary reaction mixture 18a subsequently goes into a residence and neutralization zone 17a, which has been realized by means of a vessel through which flow occurs and has been provided for further reaction of each reaction mixture, in order subsequently to guarantee a reliable pH measurement PH1 for regulating the amount of sodium hydroxide 5 fed in. A pH of 1.6 is established in the reaction mixture exiting from the first stage 6.

In the next step, the still acidic salt brine goes into the second stage, which is operated at ambient pressure, of the neutralization plant 2. The residence time thereof is ensured by means of a reaction vessel (not shown) which is operated at atmospheric pressure and is located in a high position by a fill level of 58.3%, corresponding to about 30 m$^3$, being established by means of a free overflow in normal operation. As a result of installation of the mixing nozzles 21, the turbulence arising in the reaction stage 2 is utilized for mixing. In addition, the mixing nozzles 21 also draw in an about four-fold stream of each reaction mixture 18b from the surrounding vessel volume. Two small mixing nozzles are oriented tangentially to the bottom and a large jet mixer acts centrally and obliquely upward and thus ensures mixing in the volume. This mixing principle is employed analogously in the third neutralization stage 3. From this stage, a main stream 7 of the reaction mixture 18b is taken off and passed to cooling 8. Here, a major part of the heat of neutralization of the first and second stage is transferred to the cooling water. In the process, the cooling water of the cooling 8 heats up from 14.7° C. to 24.5° C. The major part of the brine outflow which has been precooled in this way is conveyed in the form of a recycle stream 9 having a flow of 120 m$^3$/h to a point upstream of the first stage of the neutralization 1. A smaller substream 7' of this brine drives, in a secondary circuit, the mixing nozzles 21. According to the pH regulation PH2, 120.0 l/h of alkali are metered into this stream at the introduction position 7" and 0.7 l/h of acid are metered in at the introduction position 7'". The backcoupling of the metering device K5 is again effected through a flow meter F5. When the secondary stream 7' is conveyed through the mixing nozzles 21, the reaction mixture 18b is homogenized in the neutralization zone 17b and a pH of 9.2, measured in the outflow 7 from this neutralization stage 2 for the cooling 8 by means of the pH measurement PH2, is established.

The reaction mixture 18b goes in the form of the stream 10 from the second stage 2 via an overflow into the third stage of the neutralization 3, which owing to the 3-fold capacity realizes a significantly longer residence time. This volume ratio of the volume of the second stage to the volume of the third stage was designed to avoid resonant oscillation of the regulations and an associated resonance catastrophe. From this third stage, a main stream 11 of the reaction mixture 18c is likewise taken off and fed to the cooling 12. In that process step, the heat of neutralization of the third stage is transferred to the cooling water. In the process, the cooling water of the cooling 12 heats up from 14.7° C. to 29° C. In return, the reaction mixture 18c cools down from 36.5° C. to 29° C. A cooling water volume flow of 466 m$^3$/h is required for cooling of the first, second and third stages (8 and 12). After cooling, the secondary circuit 11' drives the mixing nozzles 22 of the third neutralization stage 3, According to the pH regulation PH3, 28.0 l/h of alkali are metered into this stream at the introduction position 11" and 34.0 l/h of acid are metered in at the introduction position 11'". When the secondary stream 11' is conveyed through the mixing nozzles 22, the reaction mixture 18e is homogenized in the neutralization zone 17c and a pH of 8.6, measured in the stream 13 by means of the pH measurement PH3, is established. To secure the measurement of the output pH from the third stage and for reasons of availability of the instrumentation, this pH measurement was triplicated (redundant). As a function of the fill level in the third stage 3, the reaction mixture 18c is discharged via a fill level regulator L1 in process step 14 when the release criteria pH (measurement PH3 and PH4) and temperature (measurement T3) are satisfied, 58.7 m$^3$/h are discharged at a constant fill level of 60.8%. When the limit values for the parameters for the resulting brine in stream 13 are exceeded, the discharge is interrupted and the volume stream 13 is conveyed in the form of the stream 16 back to the third neutralization stage 3. Thus, in the first step, brine can be buffered for a short time in the second and third reaction stage (2 and 3). For this purpose, both reaction stages are operated only about ¾ full in normal operation. In the second step, if further regulation of the circuit operation of the third stage is not successful, the feed stream of acid and thus alkali into the first stage is gradually decreased (see load reduction concept).

Details of the Design of the Metering Devices:

The alkali for the first stage 1 is taken from the network and metered in via two parallel valves K4 which have a gradated valve size (kvs value). The fine valve is regulated directly and has a maximum throughput which is a factor of 10 lower than that of the coarser valve. The latter is regulated more slowly by the manipulated variable of the small valve, so that no resonance between the valves occurs. When the smaller valve reaches its maximum opening when production is increased over a ramp, the coarser valve is opened slightly. As a result, the smaller valve can close somewhat again. This actuation of the larger valve occurs repeatedly until the required target pH is reached. Likewise, the coarser valve closes stepwise when the fine valve threatens to close. Rapid and precise regulation of the stream of alkali can be achieved in this way. In the transition to the first opening of the coarser valve, a hysteresis is passed through because the valves no longer meter linearly in the boundary region. Thus, the small valve in this region goes through the entire setting range, while at higher volume flows it should remain at from 20 to 80% manipulated variable.

This basic principle described here for the example of the first stage is also implemented analogously in the second stages 2 in the sodium hydroxide introduction K5 and the third stage 3 in the sodium hydroxide introduction K6. The second and third stages attempt primarily to regulate to the prescribed pH values. While the bandwidth for the third stage is predetermined by the release limits, the first and second stages can be prescribed according to the performance of the regulations. Since the expected streams of sodium hydroxide introduced in the third stage are very small, metering is carried out via a valve and in parallel via a displacement pump.

According to the high accuracy requirements which the metering has to meet due to the desired pH values of the stages, overswing is possible. Although, after correction of the regulation, acidic solution continues to flow from the preceding stages, introduction of acid in both stages 2 and 3 has been additionally realized because of the somewhat long residence times. The simple regulating valve is again guided via the subsequent flow meter.

Details of the Design of the Regulating Concept:

The comprehensive method concept described here is based on a regulating concept which is characterized by measurement of many process parameters such as inflow volume streams, inflow pressures and also temperature, fill level and pH per reaction stage and also monitoring of the cooling water temperature, and allows firstly fully automated operation of the plant via an intelligent process control and secondly a particular variation of the process parameters of the inflowing media (concentration, pressure and amount) to which the overall system reacts automatically. Direct intervention of the operator after start-up of the plant is not necessary in normal operation. Thus, a regulating circuit for the pH, which determines the amounts of neutralizing agent required and sets these at the metering valves, is used in each stage. Accordingly, a constant pH which with increasing reaction stage number approaches the target pH is aimed at in each stage.

The integrated concept for load regulation makes it possible to run the neutralization plant at an efficient load and considerably simplifies operation of the plant by personnel. The load regulation carries out an automatic reduction in the load in order to keep critical process parameters within their limit values. Thus, the capacity of the neutralization plant can be matched optimally and economically to the required neutralization capacity. Here, the neutralization plant is run automatically operated under maximum load while adhering to the prescribed limit values for the process parameters of the product solution and optimal usage of the plant capacity at maximum throughput. In this load regulation taking into account the regulation of load-dependent process parameters, the setting of a constant desired load value for the HCl stream (4) to be neutralized by the plant operator is combined with an automatic load change via that in the process control system in the case of process parameters approaching their upper limit value. This concept is suitable for applications in which the load has an inverse effect on the process parameters, i.e. an increase/decrease in the load leads to a rise/lowering of the process parameters. In normal operation, i.e. when the process parameters taken into account (T1, PH1, PH2, T2, PH3, T3, PH4 and also further quality parameters (turbidity and conductivity)) are below their limit value, the load prescribed by the plant operator is operated. The fact that the critical process parameters are in the noncritical range indicates to the plant operator that the set value of the load can be increased by intervention by the plant operator. When the respective process parameter approaches its upper limit value, an automatic load change is brought about by the process control system in order to keep the deviating process parameter within its threshold value. The automatic load change is carried out via regulating circuits (e.g. PID, MPC) provided for the respective process parameter. For this purpose, superposed master regulating circuits are provided in each case for the load setting and the process parameters; these have the object of regulating the respective process parameter by means of the load as manipulated variable to its intended value. The manipulated variables of the master regulating circuits are in each case intended values for the subordinate regulating circuit (slave) which intervenes via an actuator (e.g. valve K1) in the process so that, at the prevailing pressure conditions and the given valve properties, the stream required by the slave regulator is established.

A further instrumentational optimization of the process conditions is the automatic cooling water regulation. The process temperatures of the first neutralization stage and also second and third neutralization stages are measured and when the intended values are exceeded, the cooling water flow is automatically increased by means of actuators in the form of regulating valves. Here, there is a regulating circuit for amount of cooling water to the cooling device of the first and second stage (8) for the temperature measurement of the first neutralization stage (T1). Furthermore, the temperature measurement of the third neutralization stage (T2) acts by means of direct regulation on a regulating valve of the cooling device of the third stage (12), In this way, the system reacts to load changes or temperature fluctuations and avoids direct intervention of the automatic load reduction when a process parameter is exceeded (see previous paragraph).

The pH regulations of the individual stages are, as recommended in the literature, implemented in the form of a "feed-forward" regulation (cf. LIPTAK, Bela G.: *Instrument Engineers Handbook.* 4$^{th}$ edition, 2005, p. 2044 ff.). Thus, not only the local volume and the local pH are utilized, but the respective inflowing solution of the preceding stage is taken into account. In the case of the first stage, the introduced volume streams flow in together. In addition, the supply pressures, which have been recognized as main malfunction parameters, are also taken into account. For the second stage, the required amount of alkali is from the circulation stream plus the streams introduced into the first stage and the pH. For the third stream, this calculation is carried out from the previously introduced volume flows and the pH at the outlet from the second stage, which thus represents the content of the reaction mixture 18c.

The neutralization plant is designed in accordance with the safety requirements for the chemicals used. Here, compatible materials of construction are employed and appropriate safety concepts for severe deviations of process parameters are provided. In addition, the plant is a closed plant if the acidic waste air streams occurring are introduced in a targeted manner to an existing exhaust air treatment plant.

The concentration of the NaCl-containing solutions formed is 20-25% by weight.

The NaCl-containing stream 15 obtained from the neutralization G can be fed to a chloralkali electrolysis L or a disposal station M.

Example 2

Hydrochloric Acid Management in an Integrated Isocyanate Plant (FIG. 6)

The following example describes the hydrochloric acid management in a production process (A) for producing isocyanates which has a capacity of 100 000 t/h of tolylene diisocyanate (TDI) and is operated at a load of 11.5 t/h of TDI and produces 9.353 t/h of HCl gas as by-product.

A hydrochloric acid electrolysis F in the form of a hydrochloric acid diaphragm electrolysis plant F having an uptake capacity of 3 t/h of HCl (100%), a transport station H for filling rail tank cars and road transport vehicles 43 are present on the site. The integrated plant also encompasses a sodium chloride electrolysis L which has a capacity of 300 000 till of chlorine and can thus take up 0.829 t/h of hydrochloric acid, calculated as 100% HCl. Also in the integrated plant there is a neutralization plant G which can process an amount of hydrochloric acid of 10 t/h, calculated as 100% HCl. Hydrogen chloride 41 which is obtained in the isocyanate production A is in normal operation fed to an HCl gas absorption C. The depleted hydrochloric acid 48 from the hydrochloric acid electrolysis F, which has an amount of 20.36 t/h and a concentration of 20% by weight, and also 15.04 t/h of water 61 are introduced as absorption medium here. Impurities are taken off together with water and hydrogen chloride from the absorption unit C. Here, 0.4 t/h of a 30% strength hydrochloric acid 60 contaminated with organics is taken off and disposed of. An amount of 44.353 t/h of a 30% strength hydrochloric acid 44 is discharged from the HCl absorption unit C.

The hydrochloric acid 44 is fed to a purification station D. In the purification station D, the hydrochloric acid 44 is treated further with activated carbon in order to remove residues of impurities.

The purified hydrochloric acid is fed to a hydrochloric acid storage facility E. From the storage facility E, 23.27 t/h of the 30% strength hydrochloric acid 54a are taken off and fed to an HCl diaphragm electrolysis F. Here, 2.91 t/h of chlorine 58 is produced from the hydrochloric acid fed in and the depleted hydrochloric acid 48, 20.36 t/h, having a concentration of 20% by weight is fed to the HCl absorption C.

From the hydrochloric acid storage facility E, the chloralkali electrolysis L present on the site is supplied with 2.769 t/h of hydrochloric acid 54c for acidification of the brine. Furthermore, 18.314 t/h of 30% strength hydrochloric acid 54b are passed to sales. For this purpose, tank cars 43 are filled.

Since no disposal by means of road transport vehicles is possible at the weekend, the 18.314 t/h of 30% strength hydrochloric acid are stored in the storage facility E. After the weekend, the storage facility E has been filled with 879 t of hydrochloric acid which at the beginning of the week is taken off either by means of road transport vehicles or by means of rail tank cars.

If the hydrochloric acid cannot be sold or taken off, the storage facility would, at a storage capacity of 1000 t, be full after 54.6 hours and the production A of TDI would have to be shut down, with the adverse economic effects. This state can occur, for example, at long weekends or over Christmas or Easter.

In this case, a proportion of 10 t/h of the hydrochloric acid 54 from the storage facility E is fed to a neutralization station G and neutralized there with concentrated sodium hydroxide 55 as described in Example 1. 10.2739 t/h of 32% strength by weight sodium hydroxide 55 are used here. 20.2739 t/h of sodium chloride solution 56 having a concentration of 23.7% by weight of sodium chloride are formed. This sodium chloride solution 56 is fed to the NaCl electrolysis L From the NaCl electrolysis 6.187 t/h of chlorine 57 are always recirculated, independently of the introduction of sodium chloride solution 56 from the neutralization G, to the chemical process A, the TDI production.

The invention claimed is:

1. A method for flexibly controlling the use of hydrochloric acid having an HCl concentration of at least 10% by weight, obtained from a continuous chemical production process (A), wherein gaseous hydrogen chloride from the continuous chemical production process is converted with water in an HCl-absorption station to hydrochloric acid, the hydrochloric acid is purified in a hydrochloric acid purification station and purified hydrochloric acid is delivered to a hydrochloric acid storage facility (E), the purified hydrochloric acid is supplied from the hydrochloric acid storage facility (E), selectively to a transport station (H), an HCl electrolysis station (F) or a chloralkali electrolysis station (L), which are offtake stations for the purified hydrochloric acid, or to a neutralization station (G), where on failure of one or more of the offtake stations (H, F, L) or in the case of offtake bottlenecks at the offtake stations (H, F, L), the hydrochloric acid is fed to the neutralization station (G) and neutralized with concentrated alkali metal hydroxide, forming a salt solution optionally fed to the chloralkali electrolysis station (L) or a disposal station (M).

2. The method as claimed in claim 1, wherein the chemical production process (A) is a production process for the chlorination of organic compounds, for phosgene production and phosgenation, a process for producing polycarbonate, or a process for incinerating chlorine-containing wastes.

3. The method as claimed in claim 1, wherein the purified hydrochloric acid is converted in the HCl electrolysis station (F) forming chlorine, and the chlorine is recycled to the chemical production process (A).

4. The method as claimed in claim 1, wherein alkali metal chloride, optionally obtained from the neutralization station (G), and hydrochloric acid is converted in the chloralkali electrolysis station (L), and the chlorine is recycled to the chemical production process (A).

5. The method as claimed in claim 1, wherein a multistage neutralization process is employed in the neutralization station (G).

6. The method as claimed in claim 1, wherein the multistage continuous neutralization (G) of hydrochloric acid having an HCl concentration of at least 10% by weight and having a volume flow of at least 1 m$^3$/h, is carried out to a target pH in the range from 3 to 9, by means of the following steps:
A) introducing the hydrochloric acid to be neutralized and a proportion of 95%, of a stoichiometrically required amount of alkali metal hydroxide (5) in a first stage into a volume flow of neutralized hydrochloric acid, wherein the volume flow of neutralized hydrochloric acid which is recirculated and cooled, from the second stage, subsequent mixing of the neutralized hydrochloric acid, the alkali metal hydroxide and the volume flow to form a primary reaction mixture and reaction of the primary reaction mixture in a neutralization and resident zone, where the pH of a stream coming from the first stage has a pH of greater than 1 and the volume flow which is recirculated and cooled from the second stage corresponds to at least three times the hydrochloric acid introduced to be neutralized in the first stage,
B) transferring the stream flowing from the first stage into a neutralization zone of the second stage, further setting of the pH of the secondary reaction mixture formed in the second stage to a value of greater than pH 3, cooling a second volume flow exiting the second stage (7) forming a cooled second volume flow and recirculating the cooled second volume flow by a secondary substream (7') of a secondary circuit to the neutralization zone of the second stage and by a primary substream to the first stage and, wherein said further setting of the pH is set by addition of alkali metal hydroxide or hydrochloric acid, where the ratio of the second volume flow exiting the second stage (7) to the volume flow of the secondary substream is at least 10:1, and
C) introducing of a further substream of the secondary reaction mixture of the second stage (10) into a neutralization zone of a third stage forming a tertiary reaction mixture, further setting of the pH value of the tertiary reaction mixture in the third stage to a pH in the range from pH 3 to pH 9 by means of addition of alkali metal hydroxide or hydrochloric acid to join a recirculated cooled volume flow of the third substream, cooling a third volume flow exiting the third stage (11) forming a cooled third volume flow and recirculating the cooled third volume flow by a third substream (11') of a third circuit to the neutralization zone of the third stage and by a further substream (13) to a final quality control unit (14) comprising a temperature and pH monitoring stage, and is taken off as a product stream (15) if the cooled third volume flow satisfies a quality criteria in the monitoring stage, or otherwise is taken off as a recirculated stream (16) to the third stage.

7. The method as claimed in claim 6, wherein the alkali metal hydroxide is sodium hydroxide.

8. The method as claimed in claim 7, wherein an average residence time of the primary reaction mixture in the first stage is from 20 seconds to 3 minutes.

9. The method as claimed in claim 6, wherein an average residence time of the secondary reaction mixture in the second stage is from 15 to 100 minutes.

10. The method as claimed in claim 6, wherein an average residence time of the tertiary reaction mixture in the third stage is from 45 to 250 minutes.

11. The method as claimed in claim 6, wherein, independent of one another, the temperature of the primary reaction mixture from the first stage is set to a value in the range from 45° C. to 80° C., the temperature of the secondary reaction mixture, is set to a value in the range from 40° C. to 75° C., and the temperature of the tertiary reaction mixture from of the third stage is set to a value in the range from 15° C. to 55° C.

12. The method as claimed in claim 6, wherein the primary reaction mixture is formed in a static mixer, where the static mixer has a mixing quality of at least 98%.

13. The method as claimed in claim 6, wherein a buffer volume in the range of +/−20% is provided in each of the neutralization zone of the second stage and the neutralization zone of the third stage.

14. The method as claimed in claim 6, wherein the mixing of the secondary reaction mixture with the mixture of the tertiary reaction mixture are carried out independently of one another using stirring tools in the neutralization zone by means of mixing nozzles which are provided in the entry region of the feed conduits for the substreams into the neutralization zone of the third stage.

15. A method for flexibly controlling the use of hydrochloric acid having an HCl concentration of at least 10% by weight, obtained from a continuous chemical production process (A), wherein gaseous hydrogen chloride from the continuous chemical production process is converted with water in an HCl-absorption station to hydrochloric acid, the hydrochloric acid is purified in a hydrochloric acid purification station and purified hydrochloric acid is delivered to a hydrochloric acid storage facility (E), the purified hydrochloric acid is supplied from the hydrochloric acid storage facility (E) selectively to a transport station (H), an HCl electrolysis station (F) or a chloralkali electrolysis station (L), which are offtake stations for the purified hydrochloric acid, or to a neutralization station (G), where on failure of one or more of the offtake stations (H, F, L) or in the case of offtake bottlenecks at the offtake stations (H, F, L), the hydrochloric acid is fed to the neutralization station (G) employing a multistage neutralization process, and neutralized with concentrated alkali metal hydroxide, forming a salt solution optionally fed to the chloralkali electrolysis station (L) or a disposal station (M), wherein the multistage continuous neutralization (G) of hydrochloric acid having an HCl concentration of at least 10% by weight and having a volume flow of at least 1 m³/h, is carried out to a target pH in the range from 3 to 9, by means of the following steps:
A) introducing the hydrochloric acid to be neutralized and a proportion of 95%, of a stoichiometrically required amount of alkali metal hydroxide (5) in a first stage into a volume flow of neutralized hydrochloric acid, wherein the volume flow of neutralized hydrochloric acid is recirculated and cooled, from the second stage, subsequent mixing of the neutralized hydrochloric acid, the alkali metal hydroxide and the volume flow to form a primary reaction mixture and reaction of the primary reaction mixture in a neutralization and resident zone, where the pH of a stream coming from the first stage has a pH of greater than 1 and the volume flow which is recirculated and cooled from the second stage corresponds to at least three times the hydrochloric acid introduced to be neutralized in the first stage,
B) transferring the stream flowing from the first stage into a neutralization zone of the second stage, further setting of the pH of the secondary reaction mixture formed in the second stage to a value of greater than pH 3, cooling a second volume flow exiting the second stage (7) forming a cooled second volume flow and recirculating the cooled second volume flow by a secondary substream (7') of a secondary circuit to the neutralization zone of the second stage and by a primary substream to the first stage and, wherein said further setting of the pH is set by addition of alkali metal hydroxide or hydrochloric acid, where the ratio of the second volume flow exiting the second stage (7) to the volume flow of the secondary substream is at least 10:1, and
C) introducing a further substream of the secondary reaction mixture of the second stage (10) into a neutralization zone of a third stage forming a tertiary reaction mixture, further setting of the pH value of the tertiary reaction mixture in the third stage to a pH in the range from pH 3 to pH 9 by means of addition of alkali metal hydroxide or hydrochloric acid to join a recirculated cooled volume flow of the third substream, cooling a third volume flow exiting the third stage (11) forming a cooled third volume flow and recirculating the cooled third volume flow by a third substream (11') of a third circuit to the neutralization zone of the third stage and by a further substream (13) to a final quality control unit (14) comprising a temperature and pH monitoring stage, and is taken off as a product stream (15) if the cooled third volume flow satisfies a quality criteria in the monitoring stage, or otherwise is taken off as a recirculated stream (16) to the third stage.

* * * * *